Figure 1:
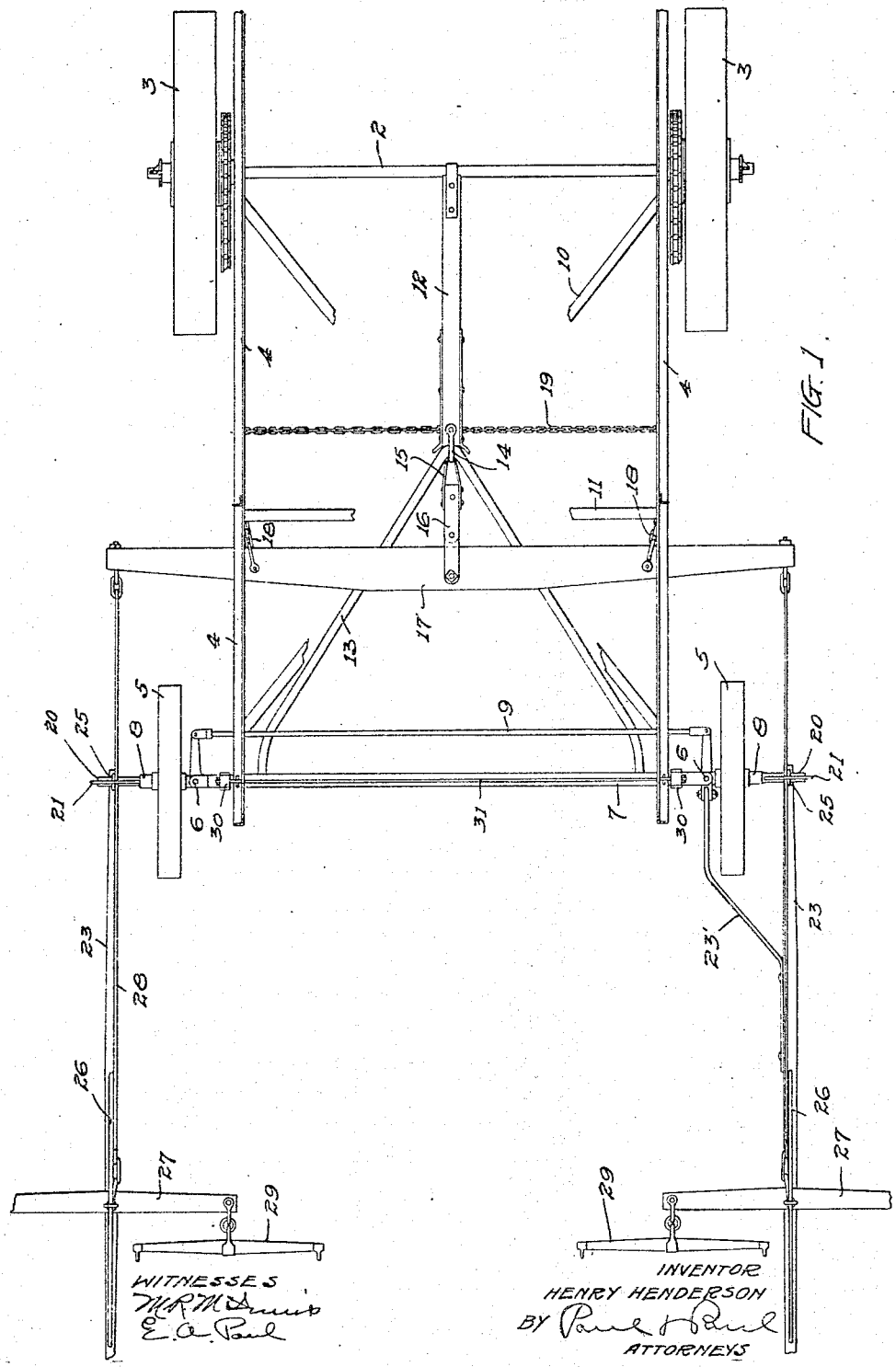

H. HENDERSON.
DRAFT RIGGING FOR SHOCK LOADERS.
APPLICATION FILED JAN. 19, 1917.

1,285,165.

Patented Nov. 19, 1918.
2 SHEETS—SHEET 1.

WITNESSES

INVENTOR
HENRY HENDERSON
BY
ATTORNEYS

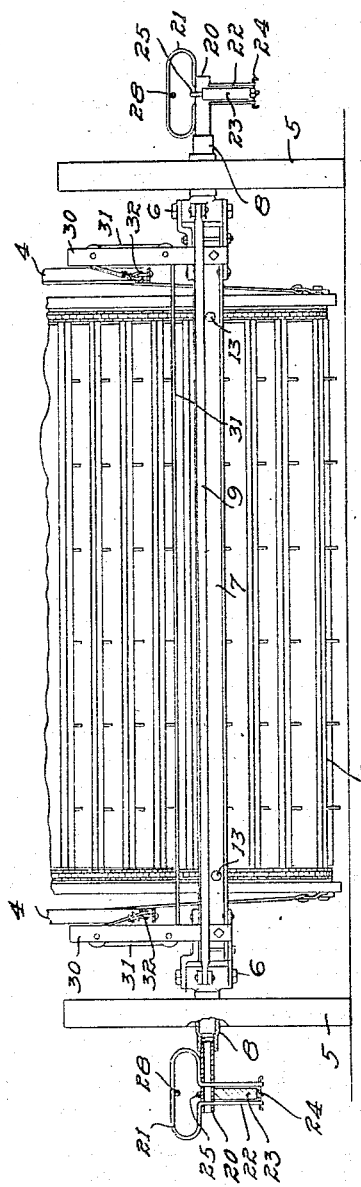

UNITED STATES PATENT OFFICE.

HENRY HENDERSON, OF HALSTAD, MINNESOTA.

DRAFT-RIGGING FOR SHOCK-LOADERS.

1,285,165.  Specification of Letters Patent.  Patented Nov. 19, 1918.

Application filed January 19, 1917. Serial No. 143,397.

*To all whom it may concern:*

Be it known that I, HENRY HENDERSON, a citizen of the United States, residing at Halstad, county of Norman, State of Minnesota, have invented certain new and useful Improvements in Draft-Rigging for Shock-Loaders, of which the following is a specification.

The object of my invention is to provide a draft rigging for a shock loader through which power may be applied to the rear axle.

A further object is to provide a rigging by means of which the draft may be equally distributed and without in any way interfering with the guiding of the machine.

Other objects of the invention will appear from the following detailed description.

The invention consists generally in various constructions and combinations, all as hereinafter described and particularly pointed out in the claims.

In the accompanying drawings forming part of this specification,

Figure 1 is a plan view of the running gear of a shock loader, with my invention applied thereto, Fig. 2 is a transverse sectional view, taken in front of the forward or guiding wheels, Fig. 3 is a side elevation, partially in section, showing the manner of connecting the equalizing bar to the rear axle.

In the drawing, 2 represents the rear axle, having carrying wheels 3 and supporting the side rails 4 of the shock-loading frame. 5 represents the forward wheels, pivoted at 6 on the forward axle 7 and having outwardly projecting spindles 8. The wheels are oscillated simultaneously through the connecting rod 9 between them. The rails 4 are connected with one another by a suitable brace and cross bars 10 and 11, and the rear axle has a forwardly projecting tongue 12 centrally mounted thereon and a bail 13 is mounted on the forward axle and has its rear end seated in the forward end of the tongue 12. A clevis 14 is mounted on the forward end of said tongue and straddles the bail 13 and engages a similar clevis 15 on a short tongue 16 which is centrally pivoted on an equalizing bar 17 which extends entirely across the machine and projects outwardly on each side thereof. Links 18 connect the end portions of this equalizing bar with the rails 4 and flexible means, such as a chain 19, is connected at its ends to the rails 4, and extends under the tongue 12 and supports the same. This equalizing bar is free to oscillate longitudinally and adapt itself for the varying character of the ground over which the machine may be moving. The spindles 8 are interiorly threaded to receive short sections of pipes 20 and loops 21, preferably of wire, have end portions 22 inserted through holes in said pipes and depending below the same to receive draft tongues 23 which are supported between said ends 22 by pins 24. The tongues are held in place between the ends of the loops by clips 25, which straddle the pipes 20 and fit into sockets in the tongues. The tongues project a considerable distance in front of the forward wheels and are provided with guides 26 whereon eveners 27 are slidable, and rods 28 pivotally connect said eveners with the ends of the equalizing bar 17 and extend through the upper portions of the loops 21 which form guides for said rods. Swingletrees 29 are mounted on the ends of the eveners. A brace 23' connects one of the tongues 23 with the steering knuckle of the adjacent wheel 5, so that horizontal oscillation of this tongue will swing the wheel and guide the machine.

The forward axle has standards 30 thereon and a cable 31 passes over sheaves on said standards across the machine and is connected at 32 to the machine frame. This manner of mounting the frame allows it to rock on its support and adjust itself to the inequalities of the ground over which the machine may be passing. The forward portion of the frame has a pick-up belt 33 mounted thereon and the rear portion the bundle receiving receptacle 34 into which the shocks are delivered by the bundle elevator. The draft animals on one side of the machine will have a rod connecting them with the animals on the opposite side, so that guiding the team on one side will serve for guiding the one on the opposite side, the pull on the tongues oscillating the wheels 5 simultaneously and guiding the machine. The draft, however, will be transmitted through the rods 28 to the equalizing bar 17 and from thence to the frame of the machine and the rear axle.

I claim as my invention:

1. The combination, with a frame having forward and rear carrying wheels, of an equalizing bar, a tongue mounted on the axle of said rear wheels and projecting forwardly therefrom, a bail projecting rearwardly from said forward axle and seated on said tongue, an equalizing bar mounted transversely of said frame and having a clevis straddling said bail and connecting the middle portion of said bar with said tongue, and draft means connected with the projecting end portions of said equalizing bar.

2. The combination, with a frame having forward and rear carrying wheels, of an equalizing bar, a tongue mounted on the axle of said rear wheels and projecting forwardly therefrom, a bail projecting rearwardly from said forward axle and seated on said tongue, an equalizing bar having its middle portion pivotally connected with said tongue, and draft means connected with the end portions of said equalizing bar.

3. The combination, with a frame having forward and rear carrying wheels, of an equalizing bar positioned in the rear of the forward wheels and connected with said frame, draft tongues mounted on said wheels and eveners slidably mounted on said tongues and connected with the end portions of said equalizing bar.

4. The combination, with a frame having forward and rear carrying wheels, of an equalizing bar, a tongue mounted on the axle of said rear wheels and projecting forwardly therefrom, a bail projecting rearwardly from said forward axle and seated on said tongue, an equalizing bar having its end portions connected with said frame and its middle portion pivotally connected with said tongue and draft means connected with the end portions of said equalizing bar.

5. The combination, with a frame having forward and rear axles and carrying wheels, said forward wheels being mounted to oscillate on their axle to guide the machine, of an equalizing bar positioned in the rear of said forward wheels, draft tongues connected with the hubs of said forward wheels, a brace connecting one of said tongues with the pivotal connection of said wheel on its axle, and draft connections attached to said equalizing bar and slidably mounted on said tongues.

6. The combination, with a frame having forward and rear axles and carrying wheels, said forward wheels being pivoted on their axle for oscillation to guide the machine, tongues connected with the hubs of said forward wheels, a brace for one of said tongues, and draft means mounted to slide on said tongues and connected with said frame.

7. The combination, with a frame having forward and rear axles and carrying wheels, of an equalizing bar in the rear of said forward wheels, guiding tongues connected with said forward wheels for oscillating the same, draft means mounted on said tongues and connected at their rear ends to said equalizing bar, the hubs of said forward wheels having guides for said draft means.

8. The combination, with a frame having forward and rear axles and carrying wheels, of an equalizing bar in the rear of said forward wheels, guiding tongues for said wheels, and draft means connected at their rear ends to said equalizing bar, the hubs of said wheels having guides for said draft means.

In witness whereof I have hereunto set my hand this 28th day of November, 1916.

HENRY HENDERSON.

Copies of this patent may be obtained for five cents each, by addressing the "Commissioner of Patents, Washington, D. C."